United States Patent [19]

Weigert

[11] Patent Number: 4,638,412

[45] Date of Patent: Jan. 20, 1987

[54] AUTOMATIC POCKETBOOK ILLUMINATOR

[75] Inventor: Hans Weigert, Ridgewood, N.J.

[73] Assignee: Mixed Bag Imports, Inc., Englewood, N.J.

[21] Appl. No.: 822,885

[22] Filed: Jan. 27, 1986

[51] Int. Cl.4 ............................................. F21V 33/00
[52] U.S. Cl. .................................... 362/156; 362/276; 150/106
[58] Field of Search ............... 362/154, 155, 156, 276, 362/802; 315/149, 150, 159; 150/106

[56] References Cited

U.S. PATENT DOCUMENTS

| | | | |
|---|---|---|---|
| 3,609,341 | 9/1971 | Castaldo | 362/156 |
| 4,281,365 | 7/1981 | Elving et al. | 315/159 |
| 4,343,032 | 8/1982 | Schwartz | 362/276 |

FOREIGN PATENT DOCUMENTS

| | | | |
|---|---|---|---|
| 1357492 | 2/1964 | France | 150/106 |
| 604604 | 9/1978 | Switzerland | 362/156 |
| 2078924 | 11/1982 | United Kingdom | 362/156 |

Primary Examiner—William A. Cuchlinski, Jr.
Assistant Examiner—D. M. Cox
Attorney, Agent, or Firm—Stefan J. Klauber

[57] ABSTRACT

A method and apparatus built into and for illuminating the interior of a pocketbook, includes a photodetector circuit sensitive to low levels of ambient light for turning on a switching circuit to energize a light bulb mounted within the pocketbook, and a relay mechanism responsive to closure of the pocketbook for preventing operation of the photodetector circuit for turning on the switching circuit.

10 Claims, 3 Drawing Figures

4,638,412

AUTOMATIC POCKETBOOK ILLUMINATOR

FIELD OF THE INVENTION

The present invention relates to an apparatus and method for illuminating the interior of a pocketbook, and more particularly to such apparatus that is only enabled under conditions of low ambient lighting whenever the pocketbook is opened.

BACKGROUND OF THE INVENTION

Many different types of illuminators for handbags and pocketbooks are known in the prior art. For example, in British Pat. No. 898,199, a self-contained illuminating device includes a power source within a housing and a switching circuit for turning on a lightbulb mounted in the housing for directing light into the interior of the handbag. The housing of the illuminating device is provided with a pair of pins for permitting the housing to be pinned into place in the lining of the interior of the handbag at an appropriate position for permitting illumination of the contents of the handbag when the switch is turned on to energize the lightbulb.

In Swiss Pat. No. 431,836, an illuminating source for a handbag is taught, including a self-contained lighting module having a switch for applying power from a power source within the module for lighting a lightbulb mounted along a lower beveled surface of the module. The housing or module is mounted rigidly to an interior upper portion of a side of the handbag. Another Swiss Pat. No. 604,604, teaches an illuminating device for a pocketbook or handbag, including a rigidly mounted housing for a power source and lightbulb upon one interior upper portion of the side of the pocketbook, and a reed switch activated to a closed position upon opening of the pocketbook, for energizing the lightbulb of the illuminating module. When the pocketbook is closed, a permanent magnet on an opposite side of the pocketbook is brought into close proximity of the reed switch for opening the reed switch to deactivate the supply of power to the lightbulb.

Still other examples of illuminating sources for use in a handbag are shown in French Pat. No. 1,357,492, wherein a lightbulb within a housing mounted on an upper portion of one interior side of the handbag is energized via a plunger switch connected to a power source whenever the handbag is opened. Also, in U.S. Pat. No. 2,400,974, an illuminating means is shown that is included within the latch of the handbag. The illuminating means must be manually turned on, and provides a searchlight under certain conditions.

None of the known prior references teach, disclose, or even allude towards the pocketbook illuminator apparatus for illuminating the interior of a pocketbook only upon opening of the pocketbook under conditions of relatively low ambient lighting levels, where it would be difficult to see the contents of the handbag or pocketbook. The present inventor recognized that such an apparatus would provide extended life for the battery of the illuminating device, and would further automate the operation of the illuminating device, along with other appropriate switching mechanisms sensitive to the opening of the handbag.

SUMMARY OF THE INVENTION

In order to overcome the problems in the prior art, the present invention includes lamp means for mounting on an inside surface of a pocketbook, thereupon energization illuminating the interior of the pocketbook, and control means also mounted within the pocketbook, including means for indicating an open pocketbook, and means for sensing the level of ambient light, for energizing the lamp means only in response to both an open pocketbook and a relatively low-level of ambient light.

BRIEF DESCRIPTION OF THE DRAWINGS

In the drawings, wherein like items are indicated by the same reference number.

DESCRIPTION OF THE PREFERRED EMBODIMENTS

Figure 1:
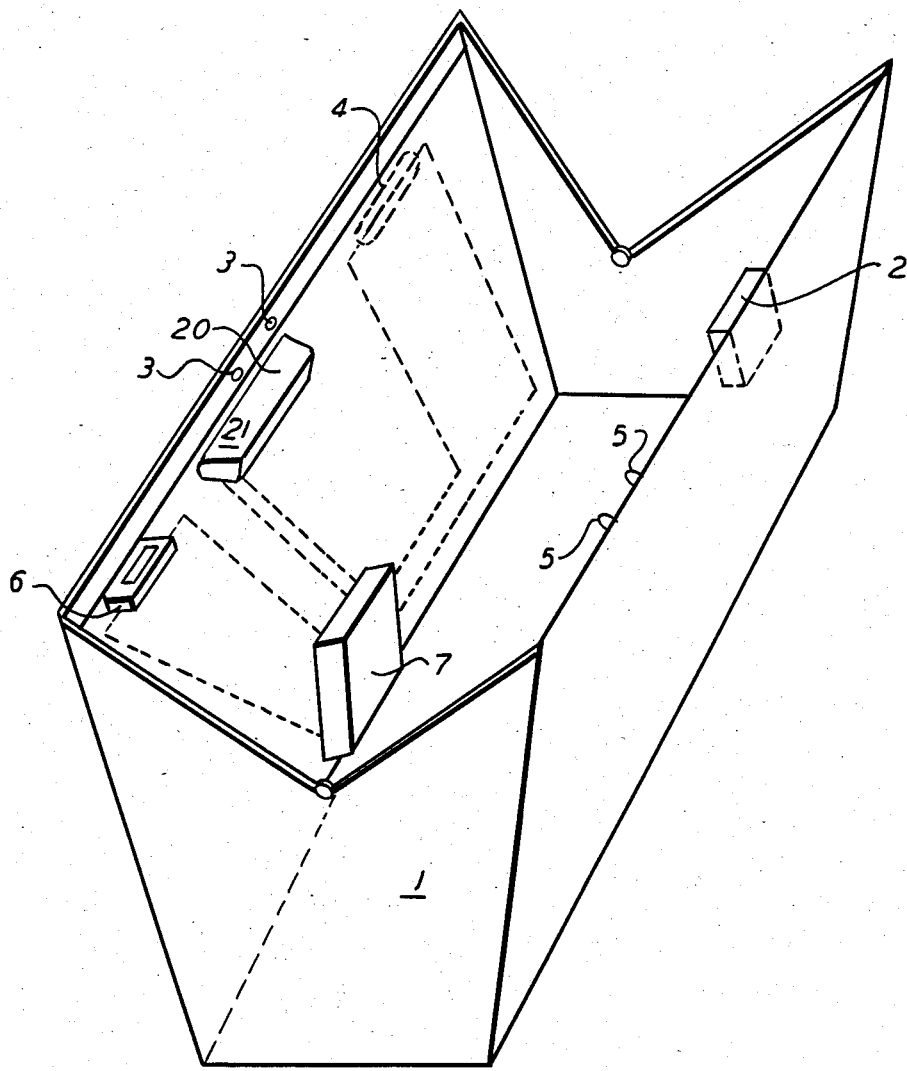
FIG. 1 shows a pictorial view of a pocketbook, including one embodiment of the present invention.

With reference to FIG. 1, one example of the apparatus of the present invention mounted within a pocketbook 1 is shown. The apparatus includes a permanent magnet 2 mounted on an upper portion of one side of the pocketbook, and a reed swtich 4 mounted within the lining, in this example, on an opposite side of the pocketbook 1 such that when the pocketbook 1 is closed, the permanent magnet 2 is juxtaposed to the reed switch 4, causing the contacts of the reed switch 4 to close. Also mounted on the same side of the interior of the pocketbook 1 and the reed switch 4 are a photodetector 6 rigidly mounted to an upper portion of the side, a control module 7, and a light reflector 20 rigidly mounted to an upper central portion of the side and forming part of a housing 21 containing a lightbulb 18 (see FIG. 2) within a socket (not shown). Also shown are a latching mechanism having female receptacles 3 and male pins 5 mounted on opposite sides of the pocketbook 1, in this example.

In general terms for operation of the present invention, when the pocketbook 1 is opened, the photodetector 6 is exposed to the ambient light, whenever the level of ambient light is below a predetermined level, the electrical condition of the photodetector 6 is such that the control circuit 7 monitoring the photodetector 6 is turned on for applying electrical current to the lightbulb 18, thereby energizing the lightbulb 18 to illuminate the interior of the pocketbook. The reflector 20 provides for even illumination and spread of the light from the lightbulb 18, and prevents light from the lightbulb 18 from shining directly into the eyes of the user of the pocketbook 1. If the level of ambient light is above the predetermined energization level, the control circuit 7 does not operate to energize the light bulb 18. Electrical connections between the photodetector 6, control circuit 7, reed switch 4, and lightbulb 18 within housing 21 are shown by electrical leads in phantom, which in this example, are assumed to be hidden within the lining of the pocketbook. When the pocketbook is closed, the permanent magnet 2 operates the reed switch 4 for closing its contacts, which in turn, effectively disables the photodetector 6 from causing the control circuit 7 to energize the lightbulb 18. In this manner, the life of the battery 24 (see FIG. 2) is prolonged, and automatic operation of the illuminating apparatus of the present invention is provided.

Figure 2:
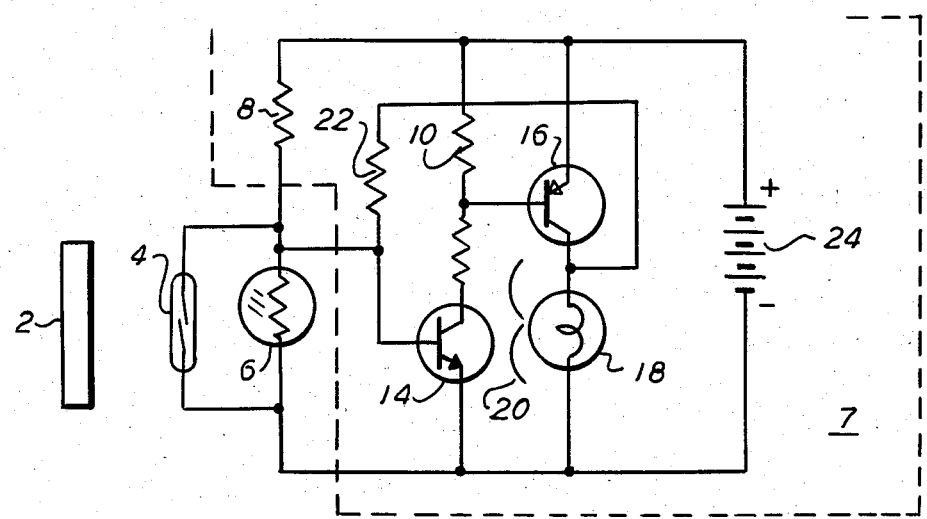
FIG. 2 shows a circuit schematic diagram for one embodiment of the invention.

The circuit schematic diagram of one embodiment of the invention, as shown in FIG. 2, will now be described. As previously explained, when the pocketbook 1 is opened, the permanent magnet 2 is moved away from the reed switch 4, causing the contacts of the reed switch 4 to open. This, in turn, activates the control circuit 7 as will be further described. If the level of ambient light is relatively high, the photodetector 6, in this example a photoresistor 6, will have a relatively low impedance, causing the base of NPN bi-polar transistor 14 to be held near ground or the negative level of the DC voltage 24, thereby cutting off or holding in a turn-off condition that transistor 14. Contrarywise, if the level of ambient light is below a certain predetermined level, the impedance of the photoresistor 6 will increase to a relatively high magnitude, causing the level of voltage across the photoresistor 6 to increase towards the positive level of voltage of the battery 24. As shown, the photoresistor 6 is included in a series voltage divider circuit with resistor 8, and the relative values of resistance of resistor 8 and impedance of photoresistor 6 will determine at any given time the level of voltage across photoresistor 6, and in turn applied to the base of transistor 14. When the level of impedance across photoresistor 6 reaches the predetermined level, the voltage developed across photoresistor 6 will cause current to flow into the base of transistor 14, turning on that transistor. When current flows into the base of transistor 14, a greatly amplified amount of current will flow through resistors 10 and 12, into the collector of transistor 14 in turn permitting current to flow from the emittor of PNP transistor 16 into the base of that transistor and through resistor 12 and the collector/emitter circuit of transistor 14, initiating the turn-on of PNP transistor 16. As transistor 16 so turns on, current will flow from battery 24 through transistor 16 into lightbulb 18, thereby energizing the light bulb 18 for illuminating the interior of pocketbook 1. As transistor 16 turns on, current flows from the collector electrode of transistor 16 back to the base electrode of transistor 14 via the current path provided by resistor 22, whereby the feedback circuit causes transistor 14 to rapidly turn on towards its saturation state, in turn speeding up the turn-on of transistor 16. If for some reason the level of ambient lighting should increase, the photoresistor 6 will sense this by decreasing its impedance, thereby shunting current away from the base of transistor 14, and substantially lowering the voltage between the base and emitter of transistor 14, turning off that transistor, and in turn turning off transistor 16 for extinguishing the lightbulb 18. If the pocketbook is suddenly closed, the magnet 2 will be again brought into close proximity to the reed switch 4, causing the contacts of the reed switch 4 to close and shunt the photoresistor 6 with a very low impedance current path, which in turn shunts the base and emitter electrodes of transistor 14, causing that transistor to rapidly turn off or cutoff (if it had previously been in a conductive or turned-on state), thereby turning off transistor 16 and extinguishing lamp 18.

Figure 3:
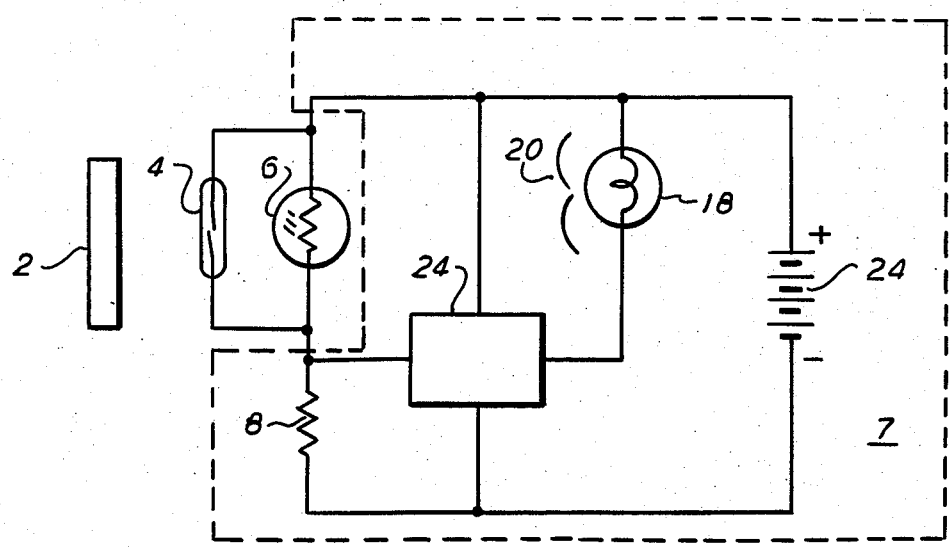
FIG. 3 shows a circuit schematic diagram for another embodiment of the invention.

An alternative to the circuitry for the control circuit 7 as shown in FIG. 3, wherein an integrated circuit module 24 replaces the transistors 14 and 16, and the resistors 10, 12 and 22. Also, in this alternative embodiment of the control circuit 7, when the pocketbook 1 is opened under conditions of relatively high levels of ambient light, the photoresistor 6 will have a relatively low impedance, causing the voltage across resistor 8 to be relatively high, which voltage is sensed by the integrated circuit 24 for preventing the flow of current through the lightbulb 18. If the level of ambient lighting is relatively low, below a predetermined level, the impedance of photoresistor 6 will increase, causing the flow of current through resistor 8 to in turn decrease, thereby reducing the voltage across resistor 8, which in turn, is sensed by the integrated circuit 24 for permitting current to flow through the lightbulb 18, thereby energizing the lightbulb to illuminate the interior of pocketbook 1. Also similar to the previous embodiment of the invention, if the pocketbook is closed, the permanent magnet 2 is placed in close proximity to reed switch 4, closing the contacts of the reed switch 4, for shunting the photoresistor 6 with a very low impedance, in turn, causing the voltage across resistor 8 to be substantially the level of voltage of battery 24, thereby preventing the integrated circuit from permitting current to flow through lightbulb 18.

In the alternative embodiment of the invention of FIG. 3, the integrated circuit 24 will provide reduced overall cost of the present invention, while providing increased battery life. Increased battery life will be provided in that the integrated circuit 24 as contemplated will require substantially no input current, in that its input circuitry could readily be provided by a CMOS Schmitt trigger. The Schmitt trigger (not shown) would be used to drive an output stage consisting of a field effect transistor (FET), (not shown), suitably scaled to provide substantially full battery voltage across the lightbulb or illumination source 18. It is further contemplated that a reflector 20 as used in the previous embodiment of the invention, could also be employed for use in this alternative and preferred embodiment.

The specific circuitry shown in FIGS. 2 and 3 is not meant to be limiting, and is given for purposes of example only. Also, the shape of the pocketbook 1, as shown, is given for purposes of example and illustration only, not meant to be limiting. It is believed that the present invention is applicable for use with many different types of handbag or pocketbook configurations, and that other forms of circuitry may be applied for use in the present invention without departing from the spirit and scope of the claims appended hereto.

What is claimed is:

1. A method for energizing a lightbulb mounted on an interior surface of a pocketbook, for illuminating the interior of said pocketbook, comprising the steps of:
    sensing the level of ambient light at times that said pocketbook is opened; and
    energizing said light bulb whenever the sensed level of ambient light is relatively low.

2. The method of claim 1 further including the step of:
    preventing said energizing step whenever said pocketbook is closed.

3. Apparatus for illuminating the interior of a pocketbook, comprising:
    lamp means mounted on an inside surface of said pocketbook, for upon energization illuminating the interior of said pocketbook; and
    control means mounted within said pocketbook, including means for indicating an open pocketbook, and means for sensing the level of ambient light, for energizing said lamp means only in response to both an open pocketbook and a relatively low-level of ambient light.

4. The apparatus of claim 3 wherein said lamp means includes:
    a lightbulb;

housing means containing said lightbulb; and reflector means mounted on said housing means at a position for reflecting light from said lightbulb throughout the interior of said pocketbook.

5. The apparatus of claim 3 wherein said control means further includes:

said means for sensing the level of ambient light being mounted near a top lip of said pocketbook, and having a first electrical condition indicative of relatively high levels of ambient light, and a second electrical condition indicative of relatively low levels of ambient light; and said means for indicating an open pocketbook including shunting means connected to said means for sensing the level of ambient light, for maintaining the latter in its first electrical condition whenever said pocketbook is closed, thereby preventing energization of said lamp means.

6. The apparatus of claim 5, wherein said means for sensing the level of ambient light consists of a photoresistor having an impedance inversely proportional to the level of ambient light, and said shunting means includes:

a normally open electrical switch having electrical contacts connected in parallel with said photoresistor; and means for operating said electrical switch to close its contacts whenever said pocketbook is closed, thereby shunting said photoresistor with a relatively low impedance, for maintaining said photoresistor in its first electrical condition.

7. Apparatus for illuminating the interior of a pocketbook when opened under low ambient light conditions, comprising:

ambient light monitoring means mounted on said pocketbook, for sensing the level of ambient light, said ambient light monitoring means providing a first electrical condition for relatively high levels of ambient light, and a second electrical condition for relatively low levels of ambient light;

lamp means mounted on an inside surface of said pocketbook, for upon energization illuminating the interior of said pocketbook; and control means mounted within said pocketbook, and electrically connected to both said ambient light monitoring means and said lamp means, for energizing said lamp means in response to said ambient light monitoring means being in its second electrical condition.

8. The pocketbook illuminating apparatus of claim 7, further including:

pocketbook closure detection means mounted within said pocketbook and connected to said control means, for preventing said control means from energizing said lamp whenever said pocketbook is closed.

9. The pocketbook illuminating apparatus of claim 8 wherein said pocketbook closure detector means is also connected across said ambient light monitoring means, for providing the first electrical condition thereof to said control means, regardless of the actual electrical condition of said ambient light monitoring means.

10. The pocketbook illuminating apparatus of claim 9, wherein said ambient light monitoring means consists of a photoresistor having an impedance that is inversely proportioned to the level of ambient light, whereby its impedance is relatively low in magnitude representing its first electrical, and vice versa for its second electrical condition, and said pocketbook closure detection means includes:

normally open electrical switch contacts connected in parallel with said photoresistor; and means for closing said electrical switch contacts in response to closure of said pocketbook, the closed switch contacts providing a substantially low-impedance current path.

* * * * *